(12) United States Patent
Orillion

(10) Patent No.: US 6,837,990 B2
(45) Date of Patent: Jan. 4, 2005

(54) VACUUM CYCLONE FOR OFF-LOADING SHRIMP AND OTHER SMALL SEAFOOD

(76) Inventor: Joseph Layne Orillion, P.O. Box 69 Air Line Hwy., Lottie, LA (US) 70756

( * ) Notice: Subject to any disclaimer, the term of this patent is extended or adjusted under 35 U.S.C. 154(b) by 55 days.

(21) Appl. No.: 10/447,509

(22) Filed: May 30, 2003

(65) Prior Publication Data

US 2004/0238421 A1 Dec. 2, 2004

(51) Int. Cl.[7] .............................................. B01D 21/26
(52) U.S. Cl. ...................... 210/95; 210/256; 210/257.1; 210/258; 210/261; 210/295; 210/304; 210/406; 210/416.1; 210/512.1; 209/12.1; 209/725; 209/733; 209/734
(58) Field of Search ........................ 210/95, 256, 257.1, 210/258, 261, 295, 304, 416.1, 406, 512.1; 209/12.1, 725, 733, 734; 55/337, 428, 459.1, 461, DIG. 3

(56) References Cited

U.S. PATENT DOCUMENTS 6,471,751 B1 * 10/2002 Semanderes et al. ...... 55/459.1
6,506,311 B2 * 1/2003 DeGarmo et al. ........ 210/512.1

* cited by examiner

Primary Examiner—David A Reifsnyder

(57) ABSTRACT

A new vacuum cyclone seafood collection retainer is disclosed. Two men easily assemble this new cyclone collection retainer, made in portable sections, and the sections can be rotated for best orientation of the hose connections. This vacuum cyclone facilitates the use of a large-scale vacuum system to offload shrimp from the holds and bins of shrimp boats and trawlers up onto the dock and into collection tubs for weighing and processing. This new vacuum cyclone system will offload shrimp and other small seafood much faster, cheaper, and with less damage to the shrimp than the conventional methods now employed. One large-scale vacuum supply pump can be connected through a common vacuum supply tank to multiple vacuum cyclone collection retainers providing multiple unloading dockside facilities.

6 Claims, 5 Drawing Sheets

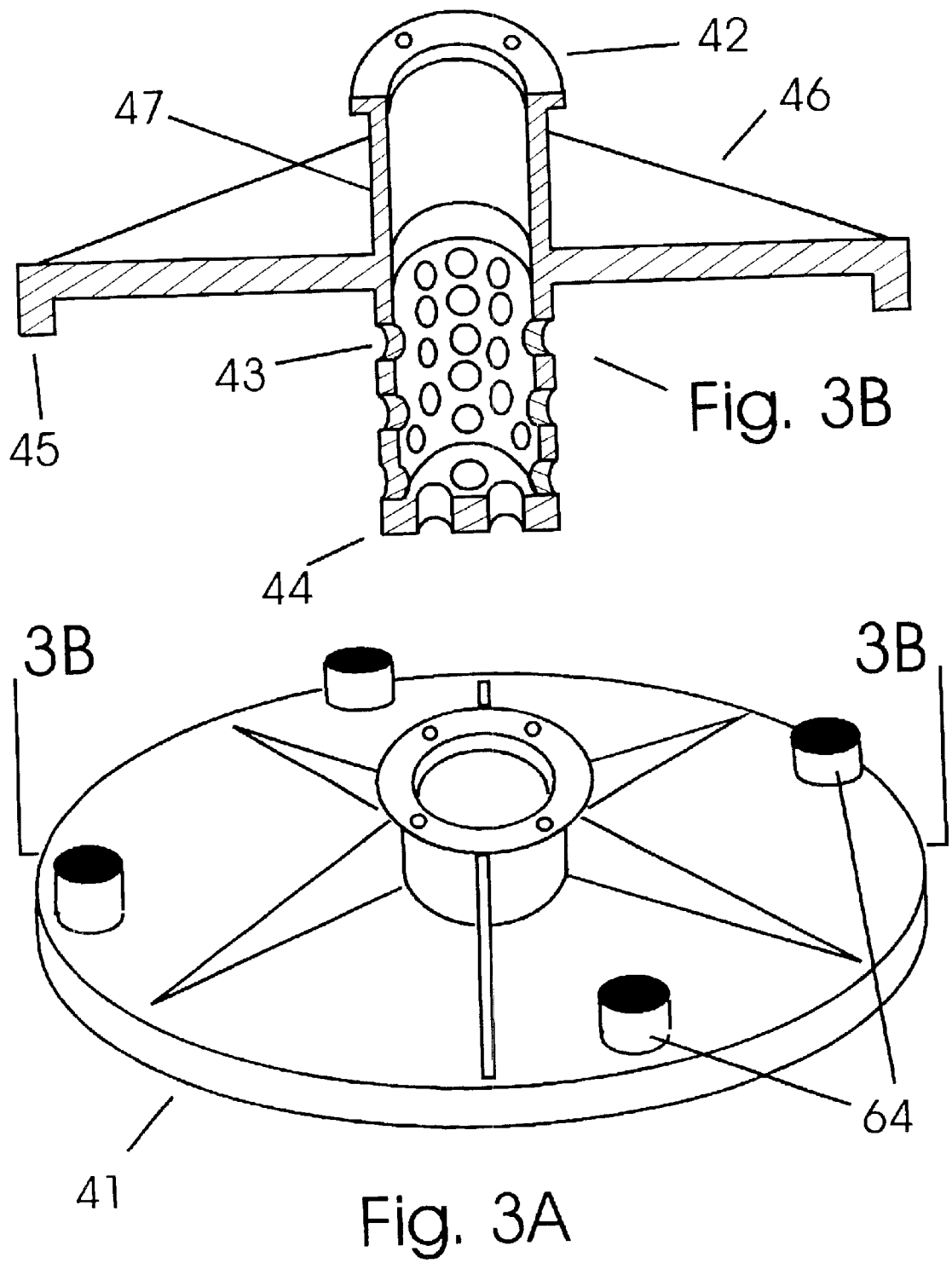

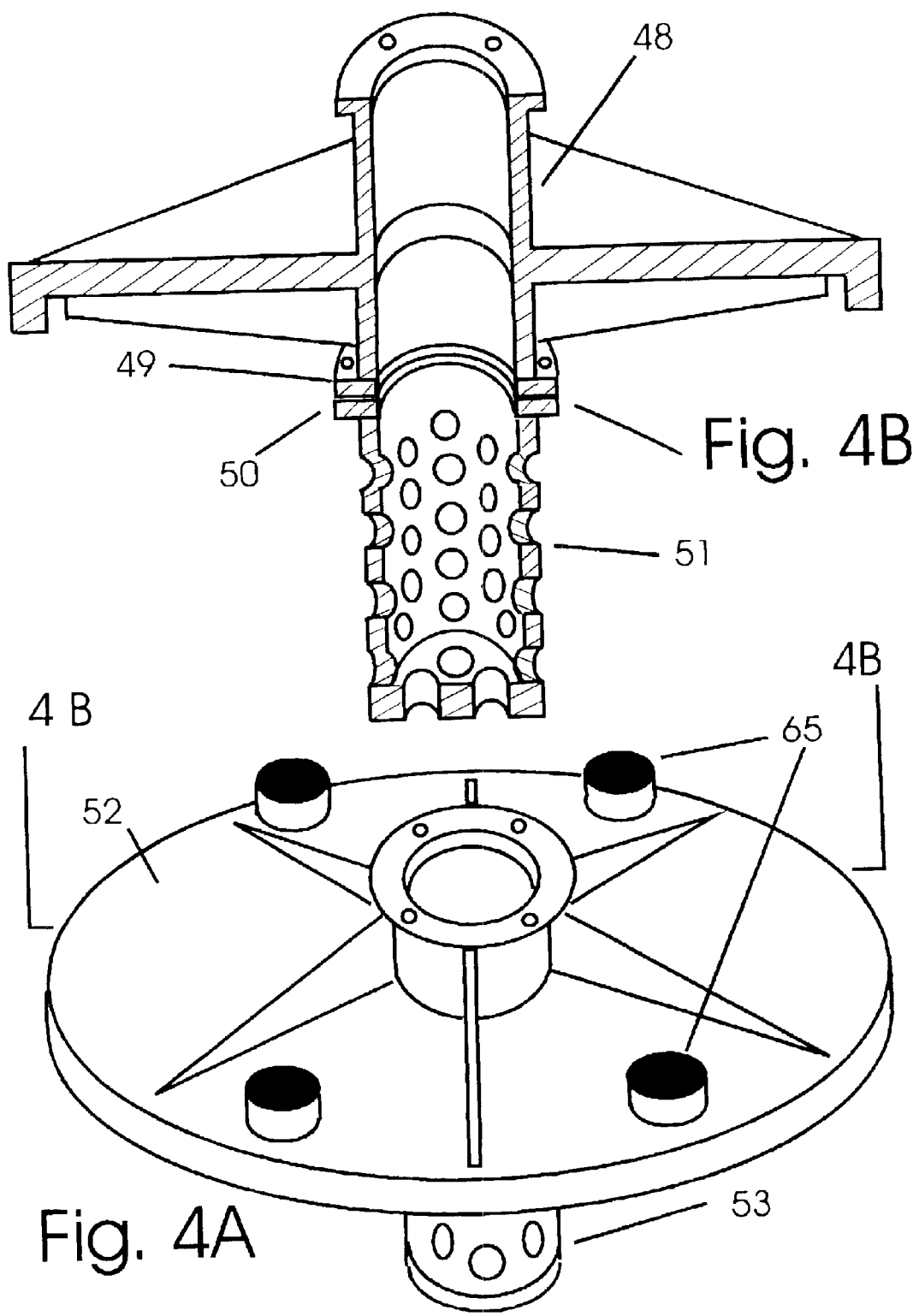

VACUUM CYCLONE FOR OFF-LOADING SHRIMP AND OTHER SMALL SEAFOOD

CROSS-REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

This instant invention relates to the methods of off-loading shrimp and other small crustaceans from the holds and storage bins of trawlers and other fishing vessels. At this time at many locations along the gulf coast of the United States and other coastal areas of the world where shrimp, mullet, and other small size sea food catches are off-loaded from the holds and bins of fishing trawlers and other fishing vessels, a slow hand labor process is utilized wherein men with shovels of various configurations load the catch onto portable conveyer belts, or into buckets or nets to be lifted up onto the dock for weighing and processing.

This instant invention seeks to remedy the present costly and slow, semi-manual, labor-intensive, sea food damaging method of off loading small size seafood catches by adapting modern very high volume vacuum technology to vacuuming the catch from the holds or other storage areas of ships and boats into a specially designed vacuum cyclone seafood collection retainer. The vacuumed catch will enter the cyclone retainer at a minimal angle to the inside circular sidewall through a uniquely designed internally smooth vacuum inlet port with no internal ridges or rings in order to minimize damage to the catch in the vacuum process.

Vacuum cyclones have been designed for many purposes but none to date have been designed to off-load small size seafood catches to a dock causing minimal damage to the product in the process.

An example of a specific use of a cyclone is shown in U.S. Pat. No. 6,506,311 issued Jan. 14, 2003 to Richard DeGarmo et al. DeGarmo discloses a cyclone, fed wet material by an auger-blower system that separates the wet material into a substantially wet and a substantially solid portion.

A second example is a polycyclonic vacuum collector for non-stop environmental remediation as disclosed in U.S. Pat. No. 6,471,751 issued on Oct. 29, 2002 to Stavros Semanderes et al. Semanderes discloses a vacuum collector comprised of a first and a second drum in series. Vacuum producing motors mounted atop the second drum pull contaminant laden air through the first drum where the majority of contaminants are deposited, thence into the second drum where more contaminants are deposited, and then through HEPA filters and out through the vacuum-producing motors.

In U.S. Pat. No. 6,491,875 issued to Paolo Palmas on Dec. 10, 2002, Palmas discloses a single stage of cyclones to separate particulate catalyst from combustion gases to reduce particulate emissions to acceptable levels.

Cyclones can be used to collect and concentrate particles in a specific size range as disclosed in U.S. Pat. No. 6,156,212 issued to Daniel J. Raider et al on Dec. 5, 2000.

Tore Joss discloses the use of cyclones using combined co-current and counter current spins to separate different specific gravities in a liquid in U.S. Pat. No. 6,132,494 issued Oct. 17, 2000.

A domestic vacuum cleaner with multiple cyclones arranged in cascade so as to capture coarser and then finer particles from dust-laden air is disclosed in U.S. Pat. No. 6,083,292 issued Jul. 4, 2000 to Silvano Fumagalli.

In U.S. Pat. No. 6,022,390 issued to Juha Jakkula on Feb. 8, 2000, a multi-port cyclone is disclosed that more efficiently separates solids from gases than single-port cyclones.

A separation apparatus for separating a mixture of materials that behave as a liquid using a cyclone having an inlet switchable into at least two conditions and a plurality of cyclones enclosed in a pressure vessel is disclosed in U.S. Pat. No. 5,947,300 issued to Tore Joss discloses in U.S. Pat. No. 5,711,374 issued on Jan. 27, 1998, a method for cyclone separation of oil and water in a cyclone positioned down hole so as to be able to reinject the water into the reservoir.

William Robinson, in U.S. Pat. No. 4,956,000 issued on Sep. 11, 1990 discloses a hydro cyclone divided into sections. Robinson discloses that previous sectioned cyclones were connected with flanged joints. Robinson describes a method for joining cyclone sections in such a way that the end of one section fits internally into the following section and the sections are held together by at least two eccentric locks of the folding strap type at each joint.

U.S. Pat. No. 4,123,364, issued Oct. 31, 1978 to Richard H. Mozley discloses a cyclone assembled from a kit with all components arranged so as to push-fit into each other and held together as an assembly by axial pressure between the centers of the end plates. Said axial pressure being supplied by a single tighten able rod member extending between said end plates.

Other U.S. patents such as U.S. Pat. No. 5,275,634 issued Jan. 4, 1994 to Erich Kramer and U.S. Pat. No. 5,160,356 issued Nov. 3, 1992 to James Dyson discloses methods of cleaning cyclones.

SUMMARY OF THE INVENTION

This invention provides a relatively fast, economical method to off load shrimp, mullet, and other small sized seafood catches from the holds of trawlers and other fishing boats onto the dock for weighing and processing with a minimum of damage.

The main component of the system is comprised of a specially designed vacuum cyclone collection vessel into which the shrimp are vacuumed from the hold of a shrimp boat. Said collection vessel is mounted on top of four braced support legs. The bottom of each pair of said support legs are connected to sections of steel or other metal angle stock that allow the cyclone collection vessel to be placed up on a watertight trough into which shrimp are collected. A powerful vacuum producing air pump pulls air from the interior of the cyclone collection vessel through a segment of vacuum hose fluidically connecting the input of the vacuum-producing pump to the output of said cyclone collection vessel. Said vacuum hose segment is attached to the outlet port of said collection vessel located in the center of the top of said collection vessel. The inlet cyclone vacuum port is positioned on the sidewall of said collection vessel near the top cover plate of said cyclone collection vessel, and aligned horizontally and tangentially to the side of the vessel so that product entering the cyclone at high speed will contact the curved inner surface of the vessel at a low angle of at lack.

The forward speed of the product, a mixture of shrimp, ice, salt, and water if present, will decrease as it moves along the curved inner surface of the cyclone. The product will fall and accumulate in said cyclone from the bottom up. The accumulation of shrimp et al, in said cyclone collection vessel, can be seen through a first and a second vertical sight glass located on the side of the center section of the cyclone. The bottom section of said cyclone is funnel shaped to a rectangle at the bottom. Placed in the rectangular bottom is a hinged door that may have enough spring loaded tension to hold the door up in the closed position when the cyclone retainer is empty and when source vacuum is absent. Alternatively a slide type door may be utilized. Both door types may or may not have a latch.

The vacuum supply connected to the outlet port in the center of the top of the cyclone collection unit provides sufficient vacuum to cause atmospheric pressure to press all segment sections of said collection unit together with sufficient force to create an airtight seal along the gasket material between said cyclone collection vessel segments, and to hold the bottom cover closed when the cover is supporting the contents of said collection vessel filled with a combination of shrimp, ice, and water if present. After vacuum suction is removed from said cyclone vacuum supply connection in the center of said top cover plate, the bottom rectangular cover, if not latched, will swing down to the open position under the weight of the contents of the collection vessel. The shrimp et al will fall into the collection trough and be removed by a conveyer belt passing beneath said collection vessel. In the event that the contents of said cyclone retainer will not fall through said open bottom rectangular cover plate, one or more back flush ports are provided on said top cover for the purpose of injecting high pressure water downward and in a direction that will tend to perpetuate the cyclonic movement of the shrimp et al., and forcefully flush out said vacuum cyclone retainer contents.

Further objects and advantages of the invented seafood cyclone collection retainer and system include:

A large single stage cyclone collection vessel manufactured in three or four easy to assemble sections, with each section able to be lifted and assembled by two men.

A uniquely designed vacuum suction inlet port with no internal ridges or protrusions to damage vacuumed shrimp.

The cyclone collection vessel and its' required vacuum pump and internal combustion engine may be mounted on a trailer or skid and easily transportable.

Virtually nonstop, inexpensive, time saving unloading of shrimp and other small type fish and crustacean cargo from the holds and live wells of shrimp boats and other fishing vessels.

Very limited damage to off loaded shrimp, fish, and crustacean cargo.

Simple and safe. No accessible moving parts and elimination of most hand labor to move a seafood cargo from a ship to a dock.

High durability because the single stage cyclone collection vessel has no moving parts other than the single hinged trap or sliding door on the bottom.

Thus a new simple single stage cyclonic collection system designed for the fast, efficient, and safe unloading of a shrimp boat or any boat or ship carrying a cargo of small seafood has been invented.

BRIEF DESCRIPTION OF THE DRAWINGS

FIG. 3A shows a top view of a first design of the top cover and integral strainer of the vacuum cyclone seafood collection retainer.

FIG. 3B shows a cross-section of a first design of the vacuum cyclone collection retainer top cover with an integral strainer.

FIG. 4A shows a top view of a second design of the vacuum cyclone collection retainer top cover with attached strainer and additional under cover braces.

FIG. 4B shows a cross-section of a second design of the top cover with attached strainer and additional under cover braces.

DETAILED DESCRIPTION OF THE INVENTION

Preferred Embodiment

Figure 1:
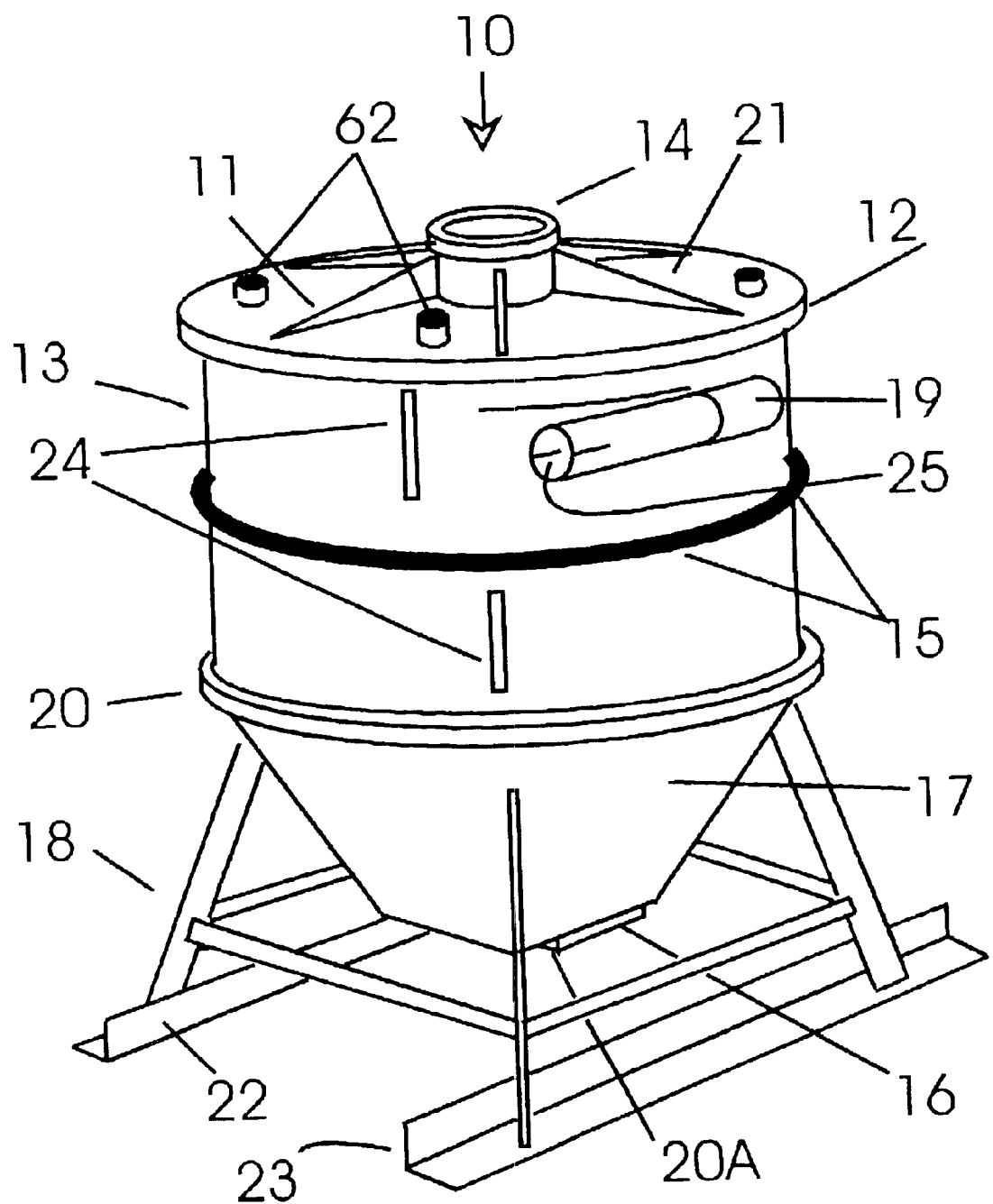
FIG. 1 shows an external view of an assembled vacuum cyclone seafood collection retainer.

Preferred embodiment 10 of the invented vacuum cyclone seafood collection retainer shown in FIG. 1 is comprised of a cover plate 21, said cover plate having a diameter inside of annular retainer lip 12 sufficient to fit over the center tubular shaped sleeve section 13. Cover plate 21 has a centrally located six inch inner diameter vacuum source connection port 14, said cover plate having external bracing 11, and annular retainer lip 12 around the outer edge of said cover plate 21. Said retainer lip 12 fits securely over and around the top flange, (described in FIG. 2), of four-foot outer diameter tube, sleeve, or center section 13 of the cyclone. Said cover plate has one or more back flush high-pressure water hose connections 62. A seven inch inner diameter vacuum suction inlet port 19 is mounted horizontally near the top edge of said cyclone tube section 13, proximate the lip of said cover plate 21. Said inlet port 19 is smoothly transitioned into said tube section 13 so that seafood vacuumed into said inlet port 19 make no hard contact with the inner surface of said tube section 13, but rather gently contact the inner surface of said tube section 13, and slow by the friction of cyclonic movement against the inner surface of said tube section 13 and fall gently to the bottom of said vacuum cyclone collection retainer 10. The vacuum suction hose attachment end of aluminum inlet port 19 has two slots 25 beginning at the hose end of said port 19 and continuing parallel with the direction of said port 19 for four inches. Said slots 25 allow a clamp to pull the seven inch inside diameter aluminum sleeve 19 tight against a six and seven eights inch outside diameter reinforced vacuum hose end placed into said port 19. A four-inch diameter version of said port 19 may be used for small size shrimp. Visual indication of the amount of shrimp vacuumed into said cyclone 10 is obtained through sight glasses 24. Structural support ring 15 is mounted circumferentially around the outside of said center section 13 midway between the ends. Retainer lip 20 is attached around the bottom edge of said tube center section 13, and fits snugly over and around the top edge of base section 17 of said cyclone collection retainer. Four braced legs 18, approximately two feet in length, support base section 17 and are attached to angle bars 22 and 23. A bottom mounted cover 20A is attached to said base section 17 by a spring-loaded hinge 16.

Figure 2:
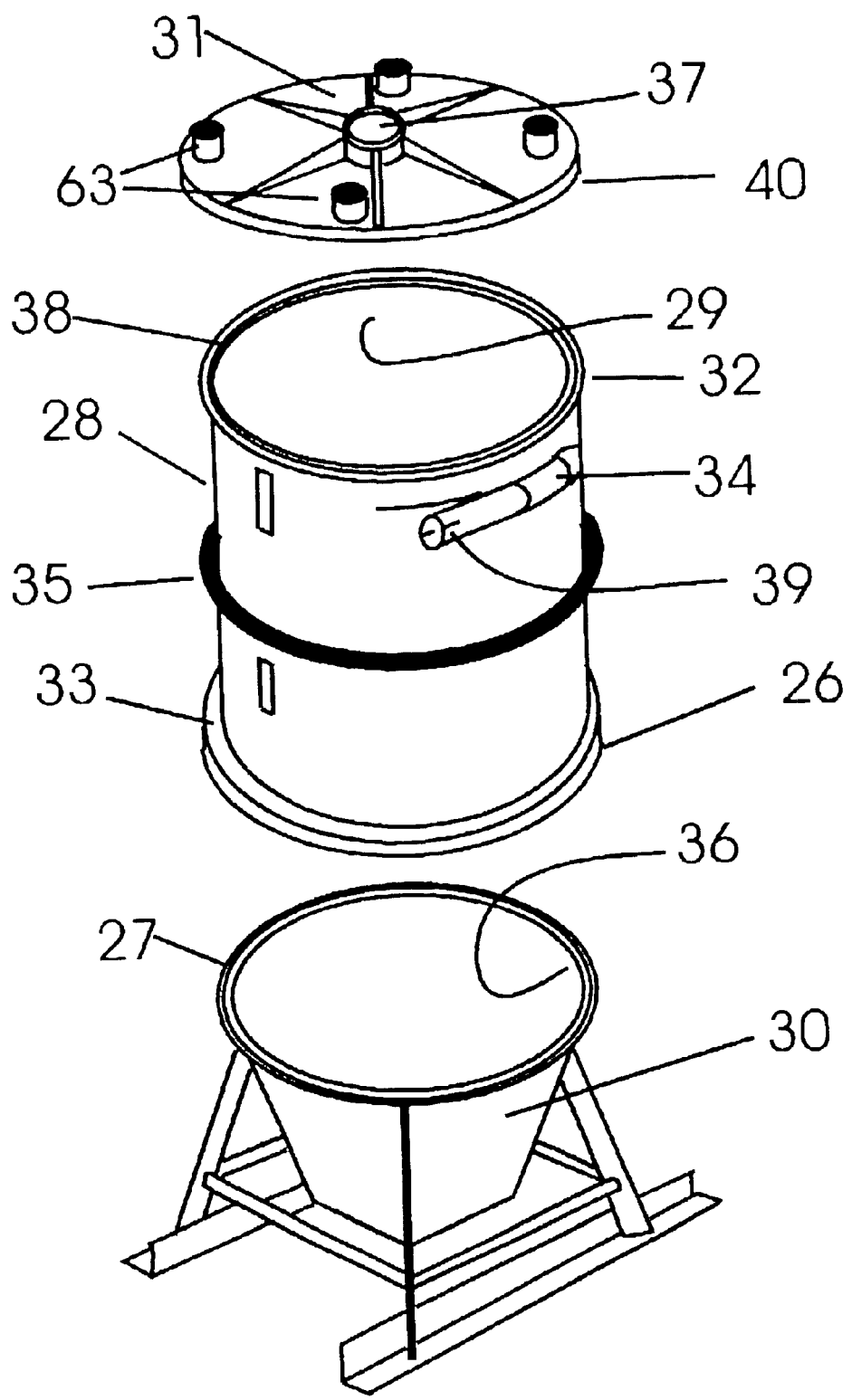
FIG. 2 shows the unassembled physical arrangement of the main components of the vacuum cyclone collection retainer.

FIG. 2A preferred first cyclonic tube 28 shown in FIG. 2 is a sleeve made of steel or aluminum, though vessels of other shapes and sizes and material composition may be used. Tube 28 has a sidewall 29, an annular flange 32 around the top of said sidewall 29, and a flat annular gasket 38 cemented to the top surface of said annular flange 32. Vacuum suction inlet port 34 is positioned to feed shrimp, ice, water, and air into drum 28 against wall 29 tangentially to limit the force of impact of the shrimp against said sidewall 29 and minimize damage to said shrimp. A support ring 35 made of steel or other material is positioned near the center of the length of said tube and around the circumference of said tube. An annular flange 33 is located around the circumference of the bottom end of said tube 28 and annular retaining lip 26 is attached thereto, and positioned to hang below the bottom edge of said tube.

The vacuum cyclone seafood collection retainer base section 30 has annular flange 36 around the top edge of said base section. A flat annular gasket 27 is cemented to said flange 36.

Cover plate 31 has an annular retainer lip 40 mounted around the circumference of said cover 31 so that the retainer lip 40 is below the bottom surface of said cover 31, and said retainer lip 40 will fit down around the top flange 32 of center section 28 so that cover 31 contacts gasket 38 mounted on flange 32 of center section 28. Cover plate 31 also has one or more high pressure water line connections 63 used to back flush shrimp or other sea food down and out of said cyclone retainer in the event the contents of said cyclone jam together and will not fall through the open bottom section door.

Base section 30 is set atop a rectangular trough through which moves a conveyer belt, and into which the shrimp laden base section 30 of the vacuum cycle seafood retainer is emptied. Tube section 28 is lifted onto bottom section 30 so that flange 33 and retainer lip 26 fits over flange 36 of base section 30, and flange 33 contacts gasket 27 of base section 30. Top section 31 is set upon tube center section 28 so that said top section contacts annular gasket 38 on flange 32.

After the three vacuum cyclone sections, top section 31, center section 28, and base section 30 have been assembled, a first section of vacuum supply hose is connected between vacuum supply port 37 of cover 31 and a centrally located vacuum supply tank (not shown). Said vacuum supply tank is equipped with a liquid blocking float valve. Said vacuum supply tank may connect to a second and a third section of vacuum supply hoses for connection to a second and third vacuum cyclone seafood collection retainers 10 of FIG. 1. The centrally located vacuum supply tank is connected in turn through a fourth section of vacuum supply hose to a vacuum source pump (not shown) of sufficient capacity and power to maintain a constant working vacuum for a single cyclone seafood collection retainer 10 under all working conditions. If multiple vacuum cyclone retainers 10 are connected to a common vacuum source tank (not shown), vacuum can be switched to the on condition for only one tank at a time. When source vacuum is supplied to the assembled vacuum cyclone retainer 10 in FIG. 1, outside atmospheric pressure against the top cover 21, and base section 17, force top cover 21 and base section 17 of FIG. 1 against gaskets 38 and 27 shown in FIG. 2, with sufficient force to make airtight connections. A first end of a first vacuum suction hose (not shown) is attached to vacuum suction inlet port 25 of FIG. 1. A second end of said first vacuum suction hose with attached guide pole is used in a shrimp boat cargo hold to off load the shrimp cargo. Said shrimp are collected into said vacuum cyclone seafood collection retainer 10 of FIG. 1 until a visible indication of the level of shrimp collected into said vacuum cyclone collection retainer 10, as shown in sight glasses 24, indicates an optimum collection level and source vacuum is removed from vacuum suction source port 14.

FIG. 3A depicts a top view of cover plate 41 with back flush ports 64, and designates cross section view 3B.

FIG. 3B shows a cross section view of top cover 46, suction supply hose attachment section 47, hose attachment flange 42, and annular cover retainer lip 45. A cross section of integral screen 44 with screen holes 43 is shown. The total area of the provided screen holes 43 is 50% greater than the cross section area of the 6-inch suction hose inlet so that shrimp screen 44 air flow turbulence does not impede the source vacuum.

FIG. 4A is a top view of a second version cover 52 with back flush ports 65 and a detachable screen 53, and defines cut away view 4B.

FIG. 4B shows a cut away side view of second version cover 48, cover screen attachment 51, screen attachment flange 50, and cover 48 screen attachment flange 49.

Figure 5C:
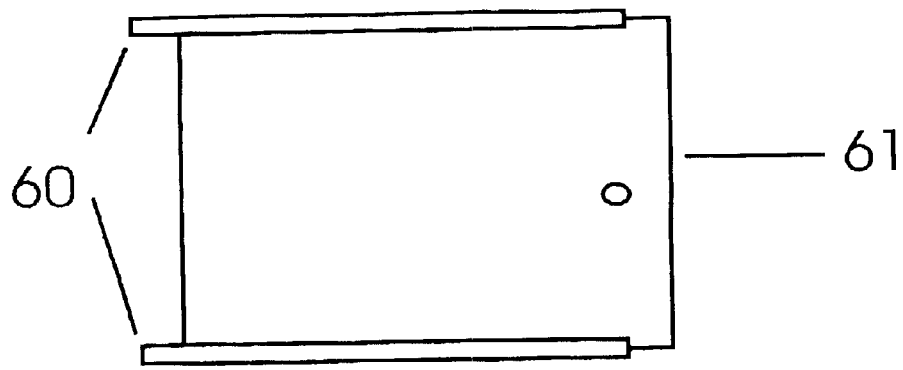
FIG. 5C shows a bottom up view of a sliding door.
Figure 5B:
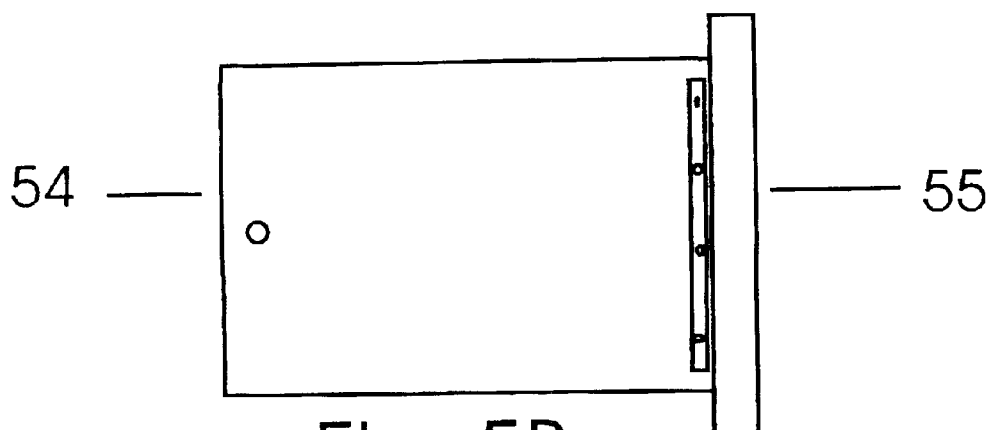
FIG. 5B shows a bottom up view of a swing down trap door.
Figure 5A:
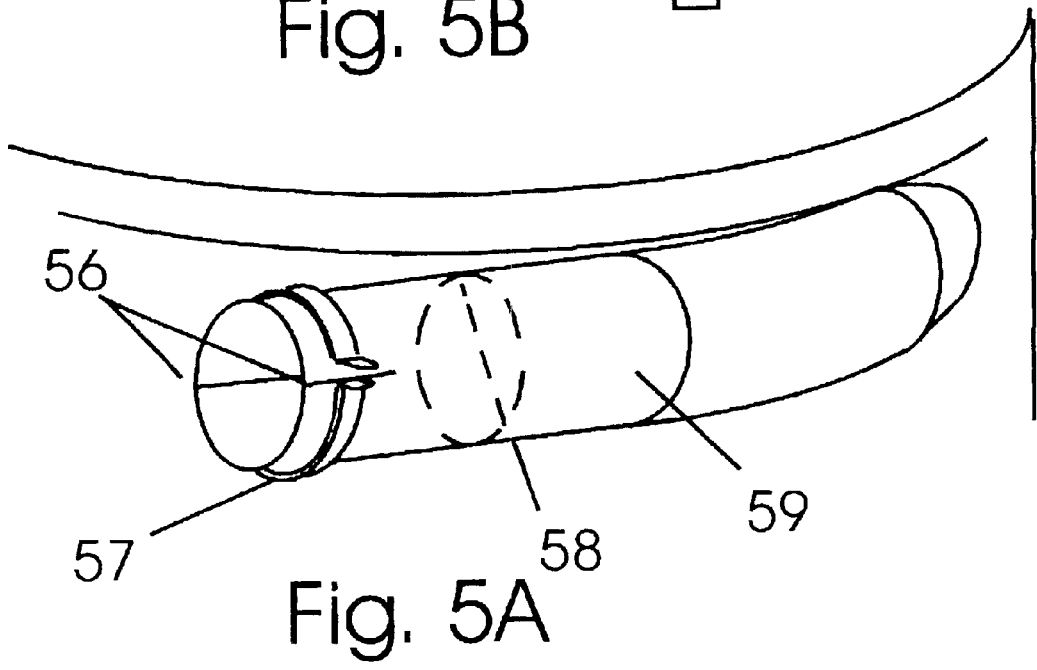
FIG. 5A shows the vacuum inlet suction hose port and suction hose attachment.

FIG. 5A is a depiction of vacuum suction port 59. The suction port 59 is constructed of aluminum and has one or more horizontal slots 56 at the hose attachment end. The 7.0 inch inside diameter port 59 will accept into it a 6⅞ inch outside diameter section of suction hose, (not shown). An annular aluminum ring 58 is welded into position in the vacuum suction port 59. The reinforced end of an inserted vacuum suction hose buts against said ring 58, that acts as a stop for said hose end. The thickness of said ring 58 is less than the thickness of said reinforced end of said reinforced vacuum hose end so that vacuumed shrimp will transition from hose to inlet port 59 and not hit any obstruction. Circular clamp 57 can then be tightened and the aluminum end of port 59 will flex together and grip the reinforced end of said vacuum suction hose.

FIG. 5B is a bottom up view of a vacuum cyclone collection retainer bottom door. Said door 54 is a trap door type with spring-loaded hinge 55. Said door 54 will be held in the closed position by outside atmospheric pressure against said door due to the vacuum within the cyclone retainer even with a full load of shrimp. Said door will open under the weight of the supported load of shrimp when vacuum is removed from the vacuum inlet port of said cyclone retainer.

FIG. 5C is a second bottom up view of a vacuum cyclone retainer bottom door. Door 61 is a sliding door and slides in tracks 60. The sliding door 61 may be used when sufficient space is not available to use trap door 54.

What is claimed is:

1. A seafood vacuum cyclone collection retainer comprising the combination of:
   (1) an approximately 4-foot diameter portable top cover;
      (a) said approximately 4-foot diameter portable top cover having an approximately 6-inch diameter vacuum source connection port;
      (b) said approximately 6-inch diameter vacuum source connection port having a screen with holes, and an annular connection flange to which a first section of vacuum hose is bolted;
      (c) said approximately 4-foot diameter portable top cover having one or more high-pressure water back flush connections that angle under said approximately 4-foot diameter portable top cover in a direction to promote and increase a cyclonic flow of the seafood;
      (d) said approximately 4-foot diameter portable top cover having one or more external welded braces;
      (e) said approximately 4-foot diameter portable top cover having an annular retainer ring about and below the circumference of said approximately 4-foot diameter portable top cover securing said approximately 4-foot diameter portable top cover over an approximately four-foot outer diameter tubular center section;

(2) the approximately 4-foot outer diameter tubular center section comprising:
  (a) an annular flange about the top circumference of the approximately 4-foot outer diameter tubular center section with a flat annular gasket cemented thereon;
  (b) an approximately 7-inch inside diameter vacuum suction port with a first end external to said approximately 4-foot outer diameter tubular center section, and a second end that tapers to a gradual transition opening in a sidewall of said approximately 4-foot outer diameter tubular center section;
  (c) said approximately 7-inch diameter vacuum suction port having a retainer ring welded inside approximately 5 inches in from said first end toward said second end, and one or more and approximately 4 inch long cuts or slots in it that begin at said first end and extend horizontally toward said second end;
  (d) said approximately 4-foot outer diameter tubular center section having one or more sight glasses in the outside wall permitting visual reference to the amount of seafood within said approximately 4-foot outer diameter center tubular section;
  (e) said approximately 4-foot outer diameter tubular center section having an annular support ring attached around the circumference near the linear center of said approximately 4-foot outer diameter tubular center section;
  (f) said approximately 4-foot outer diameter tubular center section having an annular flange attached around the bottom circumference of said approximately 4-foot outer diameter tubular center section and attached to an annular retaining lip, said annular flange and annular retaining lip fitting on and over a bottom section having an approximately 4-foot inner diameter top converging down to a smaller square or rectangular bottom;

(3) the bottom section having an approximately 4-foot inner diameter top converging down to a smaller square or rectangular bottom comprising:
  (a) an annular flange around the top circumference of the approximately 4-foot inner diameter top of said bottom section with an annular flat gasket cemented thereon;
  (b) said smaller square or rectangular bottom of said bottom section being supported by two pair support legs, each of said two pair of support legs being fastened to a horizontal angle beam of sufficient length to extend between and beyond said two pair of support legs;
  (c) said smaller square or rectangular bottom of said bottom section having an unloading door to off load the seafood when vacuum is removed from said approximately 6-inch diameter vacuum source connection port of said approximately 4-foot diameter portable top cover of said seafood vacuum collection retainer.

2. The seafood vacuum collection retainer according to claim 1 wherein the screen with holes is integral with said approximately 6-inch diameter vacuum source connection port, the combined area of the holes being greater than the cross section area of the approximately 6-inch diameter vacuum source connection port.

3. The seafood vacuum collection retainer according to claim 1 wherein the screen with holes is removable from said approximately 6-inch diameter vacuum source connection port.

4. The seafood vacuum collection retainer according to claim 3 wherein the approximately 4-foot diameter portable top cover further comprises one or more internal welded braces.

5. The seafood vacuum collection retainer according to claim 1 wherein the unloading door is a trap door having a spring loaded hinge.

6. The seafood vacuum collection retainer according to claim 1 wherein the unloading door is a sliding door.

* * * * *